US010422463B2

(12) United States Patent
Kiest, Jr.

(10) Patent No.: US 10,422,463 B2
(45) Date of Patent: *Sep. 24, 2019

(54) METHOD AND APPARATUS FOR REPAIRING A PIPE USING A TRANSITION TUBE

(71) Applicant: LMK Technologies, LLC, Ottawa, IL (US)

(72) Inventor: Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,202

(22) Filed: Apr. 3, 2018

(65) Prior Publication Data

US 2018/0224049 A1 Aug. 9, 2018

Related U.S. Application Data

(63) Continuation of application No. 14/713,500, filed on May 15, 2015, now Pat. No. 9,945,505.

(51) Int. Cl.
*F16L 55/18* (2006.01)
*F16L 55/165* (2006.01)
*F16L 55/179* (2006.01)

(52) U.S. Cl.
CPC ........... *F16L 55/18* (2013.01); *F16L 55/1651* (2013.01); *F16L 55/179* (2013.01)

(58) Field of Classification Search
CPC ..... F16L 55/18; F16L 55/1651; F16L 55/179; F16L 55/162; F16L 55/165; F16L 55/1657
See application file for complete search history.

(56) References Cited

U.S. PATENT DOCUMENTS

| | | | |
|---|---|---|---|
| 5,322,653 A | 6/1994 | Muller | |
| 5,329,063 A | 7/1994 | Endoh | |
| 5,351,720 A | 10/1994 | Maimets | |
| 5,560,395 A | 10/1996 | Bissonnette et al. | |
| 5,624,629 A | 4/1997 | Wood | |
| 5,855,712 A * | 1/1999 | Toyoda | B29C 63/0047 156/287 |
| 5,950,682 A | 9/1999 | Kiest | |
| 5,964,249 A * | 10/1999 | Kiest, Jr. | B29C 63/0095 138/97 |
| 5,967,192 A | 10/1999 | Lewin | |

(Continued)

OTHER PUBLICATIONS

PCT/US2016/031562—Written Opinion—dated Aug. 8, 2016.

*Primary Examiner* — James F Hook
(74) *Attorney, Agent, or Firm* — Nyemaster Goode, PC

(57) ABSTRACT

Apparatus and methods for lining a pipe line having a first pipe section in communication with a second pipe section where the first pipe section has an inside diameter greater than an inside diameter of the second pipe section. A transition tube having an outside diameter substantially equal to the inside diameter of the second pipe section and a length substantially equal to or greater than the length of the first pipe section is inverted into the pipe line along with a liner. A resinous material applied to the liner cures and hardens the liner after inversion. The transition tube creates a surface against which the liner can be compressed to help prevent the liner from being overstretched in the wider first pipe section.

24 Claims, 10 Drawing Sheets

(56) References Cited

U.S. PATENT DOCUMENTS

| | | | |
|---|---|---|---|
| 5,971,031 A * | 10/1999 | Kamiyama | F16L 55/179 |
| | | | 138/97 |
| 6,085,794 A | 7/2000 | Kamiyama et al. | |
| 7,073,536 B2 | 7/2006 | Blackmore et al. | |
| 7,216,674 B2 | 5/2007 | Manners | |
| 7,896,032 B2 | 3/2011 | Kiest | |
| 7,975,726 B2 | 7/2011 | Kiest | |
| 8,715,800 B2 | 5/2014 | Kiest | |
| 8,807,172 B2 | 8/2014 | D'Hulster et al. | |
| 9,052,051 B2 | 6/2015 | Maimets et al. | |
| 9,341,302 B2 | 5/2016 | Kiest | |
| 9,423,064 B2 | 8/2016 | Mathey et al. | |
| 9,506,596 B2 | 11/2016 | Kiest | |
| 9,568,139 B2 | 2/2017 | Muhlin et al. | |
| 9,791,089 B2 | 10/2017 | Kiest | |
| 9,945,505 B2 * | 4/2018 | Kiest | F16L 55/18 |
| 2007/0240779 A1 * | 10/2007 | Kamiyama | F16L 55/179 |
| | | | 138/98 |
| 2010/0263759 A1 * | 10/2010 | Maimets | F16L 55/163 |
| | | | 138/98 |
| 2011/0203719 A1 * | 8/2011 | Kiest, Jr. | F16L 55/1651 |
| | | | 156/94 |
| 2013/0140022 A1 * | 6/2013 | Leighton | E21B 29/10 |
| | | | 166/277 |
| 2013/0174979 A1 * | 7/2013 | Kiest, Jr. | F16L 55/1654 |
| | | | 156/287 |
| 2013/0199462 A1 * | 8/2013 | Bienentreu | F28F 11/02 |
| | | | 122/235.14 |
| 2014/0102576 A1 * | 4/2014 | Kiest, Jr. | F16L 55/1651 |
| | | | 138/98 |
| 2014/0311607 A1 * | 10/2014 | Mathey | F16L 55/18 |
| | | | 138/98 |
| 2015/0192237 A1 * | 7/2015 | Kiest, Jr. | F16L 55/1651 |
| | | | 138/97 |

* cited by examiner

METHOD AND APPARATUS FOR REPAIRING A PIPE USING A TRANSITION TUBE

This application is a continuation of U.S. patent application Ser. No. 14/713,500 filed on May 15, 2015, the complete disclosure is hereby expressly incorporated by this reference.

BACKGROUND

The present invention relates to cured-in-place pipe lining. More specifically, but not exclusively, the present invention relates to apparatus and methods for lining from a larger diameter pipe to a smaller diameter pipe.

As the infrastructure of major cities and towns in the developed world age, the sewer systems weaken. Pipe degradation, system blockage, water infiltration, and sewer leakage are major problems that aging sewer systems experience. As these problems persist, the sewer system may eventually experience total failure and entire sections of the sewer system may collapse. As a result, sinkholes may form and sewers may back up into homes and places of business. One method of addressing this critical infrastructure problem is the use of pipe lining techniques to rehabilitate existing sewer systems.

Cured-in-place pipelining (CIPP) is one such technique that includes rehabilitating an existing sewer system by creating a new pipe within an existing pipe. A liner, impregnated with a resinous material capable of curing and hardening, is inverted or pulled into a damaged pipe. The liner is pressed against the wall of the existing pipe, and the resinous material is allowed to cure and harden. The result is a replacement pipe having the older pipe or "host pipe" on the exterior. The cured-in-place pipe acts to alleviate the problems caused by structural defects and blockages in the existing sewer system.

It is not uncommon that a pipe will have a change in diameter. For example, a lateral sewer pipe could have an inside diameter of 6 inches for the first foot of pipe extending from a main sewer pipe and then transition to a 4-inch diameter pipe. One way of dealing with this change in pipe diameter is to custom manufacture the lateral liner. This would normally require taking measurements in the field, sending the information to a liner manufacturer, fabricating the custom liner, and then installing the liner at a later date. This time-consuming process and additional labor to pre-measure the pipe adds to the cost of the project.

The pipe measurements must also be precise. In the example of the 6-inch pipe section adjacent to a 4-inch pipe section described above, the contractor would not want to line the 4-inch pipe with a larger diameter liner. As such, there is an incentive to have the custom liner made such that the larger diameter portion is shortened to ensure that the smaller diameter liner is actually entering the smaller diameter pipe. Yet it is desirable that the liner be compressed against the host pipe. If not constrained, one could overstretch the liner, causing resin to ring out of the liner with gravity pulling the resin to the bottom of the host pipe.

There is therefore a need in the art for an improved apparatus and methods for lining a pipe line with different diameters.

SUMMARY

One aspect of the present invention includes a method of repairing a pipe having a first pipe section in communication with a second pipe section where the first pipe section has a length and an inside diameter greater than an inside diameter of the second pipe section. The method generally includes taking a liner tube, taking a transition tube having an outside diameter substantially equal to the inside diameter of the second pipe section and a length substantially equal to or greater than the length of the first pipe section, applying a resinous material capable of curing and hardening to the liner tube, positioning the transition tube inside the liner tube, inverting the transition tube and the liner tube into the first pipe section so that the transition tube is on the outside of the liner tube in the first pipe section and the liner tube extends beyond the transition tube and within the second pipe section, and allowing the resinous material to cure and harden.

Another aspect of the present invention relates to a method of repairing a portion of a lateral pipe and a junction between the lateral pipe and a main pipe where the lateral pipe has a first pipe section with a first end proximate the pipe junction and an opposite second end in communication with a second pipe section, and the first pipe section has a length and an inside diameter greater than an inside diameter of the second pipe section. The method generally includes taking a liner assembly comprising a main liner member and a lateral liner tube extending from the main liner member at a liner juncture, taking a bladder assembly comprising a main bladder tube and a lateral bladder tube extending from the main bladder tube proximate the liner juncture, and taking a transition tube having an outside diameter substantially equal to the inside diameter of the second pipe section and a length substantially equal to or greater than the length of the first pipe section, applying a resinous material capable of curing and hardening to the liner assembly, positioning the transition tube at least partially inside the lateral liner tube proximate the liner juncture and the liner tube at least partially inside the bladder tube proximate the liner juncture, securing the transition tube to the liner assembly, positioning the main liner member against the main pipe, inverting the transition tube and the lateral liner tube into the first pipe section so that the transition tube is on the outside of the lateral liner tube in the first pipe section and the lateral liner tube extends beyond the transition tube and within the second pipe section, and allowing the resinous material to cure and harden.

Yet another aspect of the present invention relates to an apparatus for repairing a portion of a lateral pipe and a junction between the lateral pipe and a main pipe. The apparatus preferably includes a liner assembly comprising a main liner member and a lateral liner tube extending from the main liner member at a liner juncture, and a transition tube having an outside diameter substantially equal to the inside diameter of the second pipe section and a length substantially equal to or greater than the length of the first pipe section. The transition tube is secured to the liner assembly and positioned at least partially inside the lateral liner tube proximate the liner juncture. Upon inversion of the transition tube and the lateral liner tube into the first pipe section the transition tube is on the outside of the lateral liner tube in the first pipe section and the lateral liner tube extends beyond the transition tube and within the second pipe section.

These and other aspects of the present invention will be described in connection with the detailed description of preferred embodiments of the invention.

DETAILED DESCRIPTION OF PREFERRED EMBODIMENTS

Figure 1:
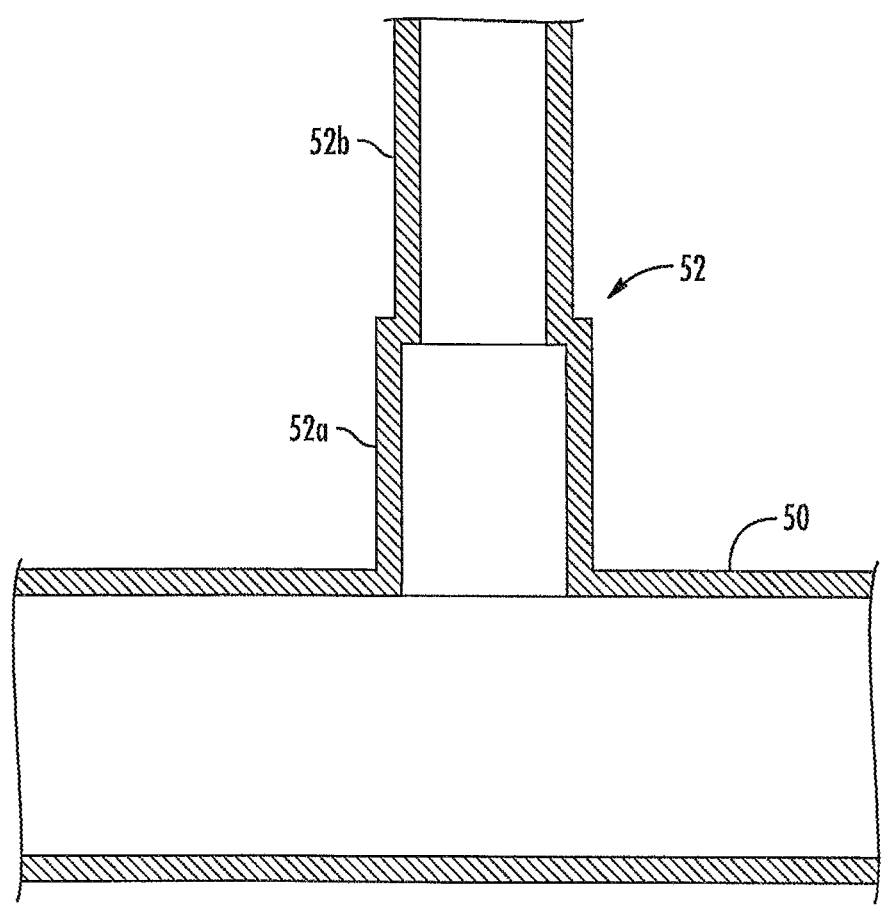
FIG. 1 is a cutaway view of a section of pipe needing repair according to one embodiment.
Figure 3:
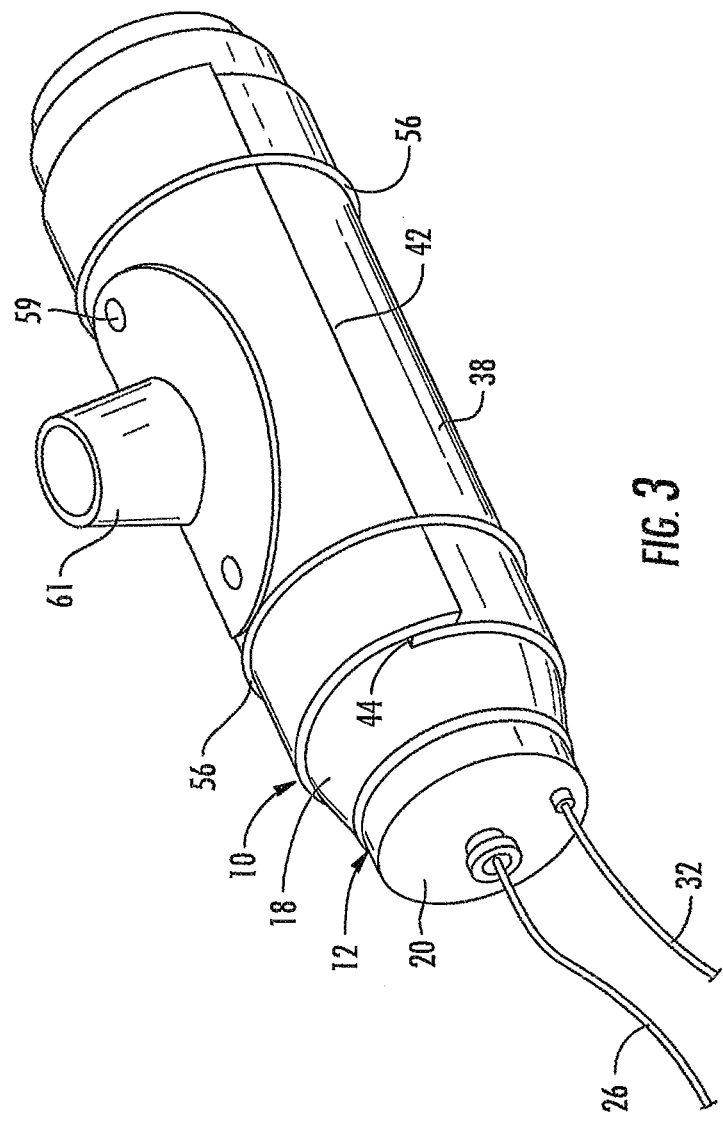
FIG. 3 is a perspective view of a repair assembly for repairing a lateral pipe line and a main pipe line wherein the repair assembly includes a compression gasket.
Figure 4:
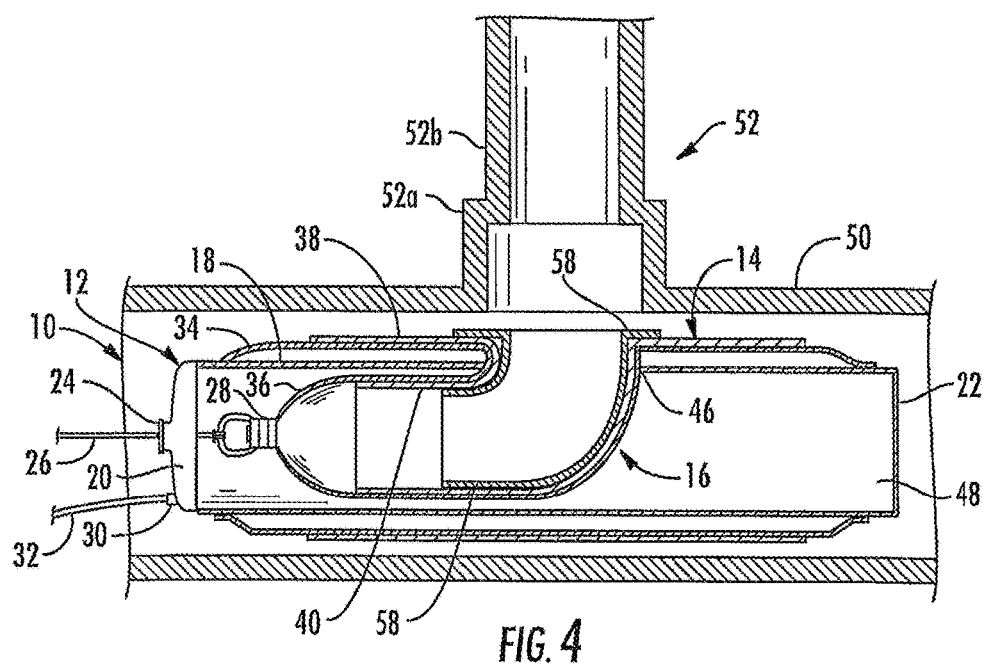
FIG. 4 is a sectional view of a launcher device positioned inside a main pipe line with a connecting a lateral pipe line, the sectional view of the launcher device is taken along section A-A of FIG. 2B.

FIG. 1 shows the inside of a pipe system wherein a main pipe 50 connects with a lateral pipe 52. The lateral pipe line 52 has a first pipe section 52a in communication with a second pipe section 52b where the first pipe section 52a has an inside diameter greater than an inside diameter of the second pipe section 52b. FIGS. 2-3 show a repair assembly generally designated by the numeral 10. The repair assembly 10 includes a launcher device 12 having mounted thereto a liner assembly 14 and a transition tube 58. Some embodiments also include a bladder assembly 16 (FIG. 4). In the particular configuration shown and described herein, the liner assembly 14, bladder assembly 16, and transition tube 58 are T-shaped to accommodate a lateral pipe line 52 that intersects with a main pipe line 50 at a generally right angle, but they can also be Y-shaped to accommodate a lateral pipe line 52 that intersects with a main pipe line 50 at an oblique angle.

Launcher device 12 includes side walls 18, an end cap 20 and an end wall 22, all of which form a launcher device cavity 48. In some embodiments end cap 20 includes a line inlet 24 through which a line 26 extends. Line 26 is attached to a closed bladder tube end 28. Also extending through end cap 20 is an air inlet 30 which is connected to an air hose 32. The bladder assembly 16 includes a main bladder tube 34 and a lateral bladder tube 36. Similarly, the liner assembly 14 includes a main liner member 38 and a lateral liner tube 40. The bladder assembly 16 is fitted on the interior of the liner assembly 14 before inversion as shown in FIG. 4.

Figure 2A:
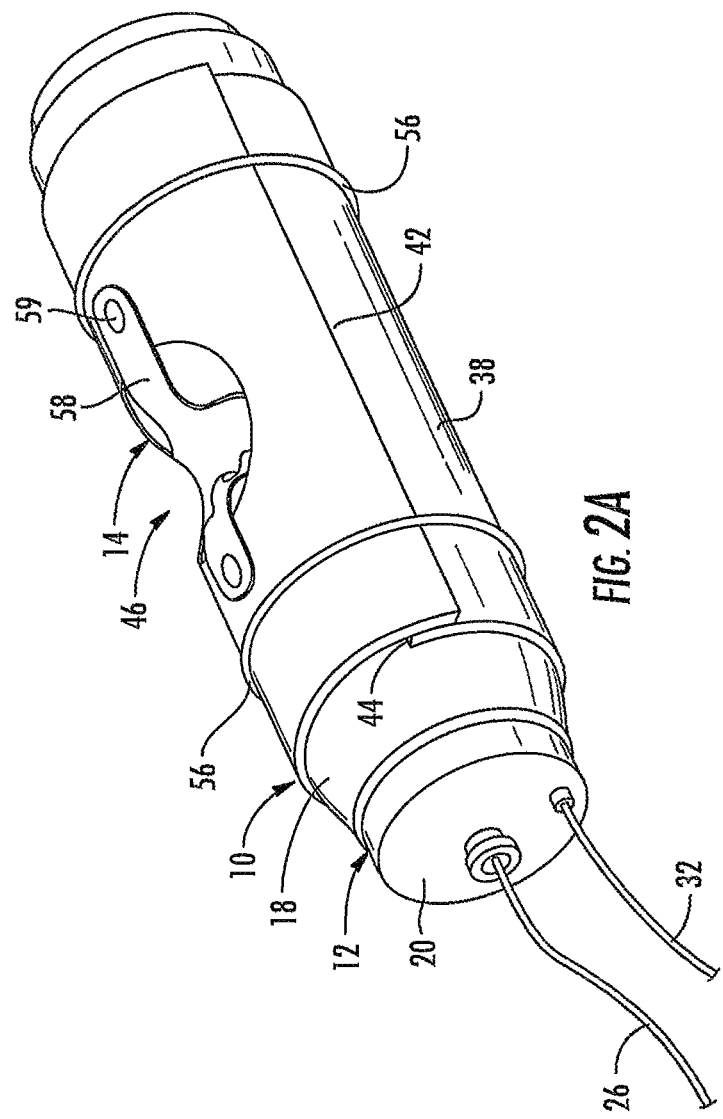
FIG. 2A is a perspective view of a repair assembly for repairing a lateral pipe line and a main pipe line.
Figure 2B:
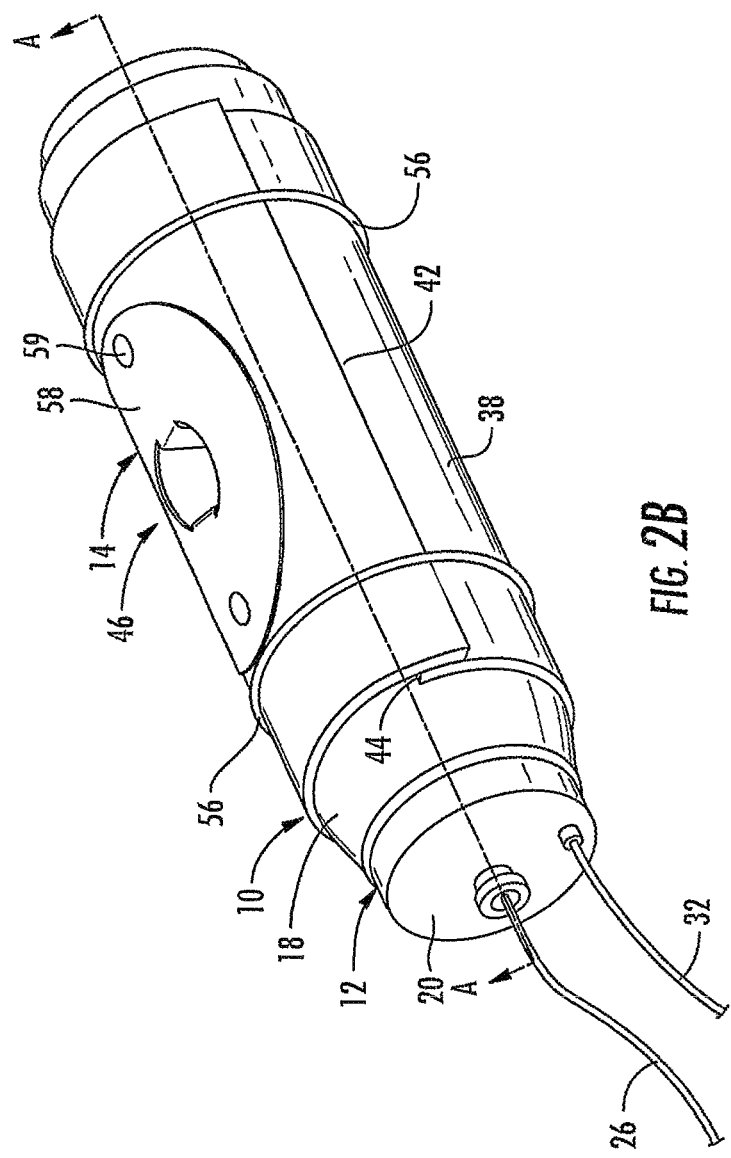
FIG. 2B is a perspective view of a repair assembly for repairing a lateral pipe line and a main pipe line wherein the transition tube includes a collar portion.
Figure 2C:
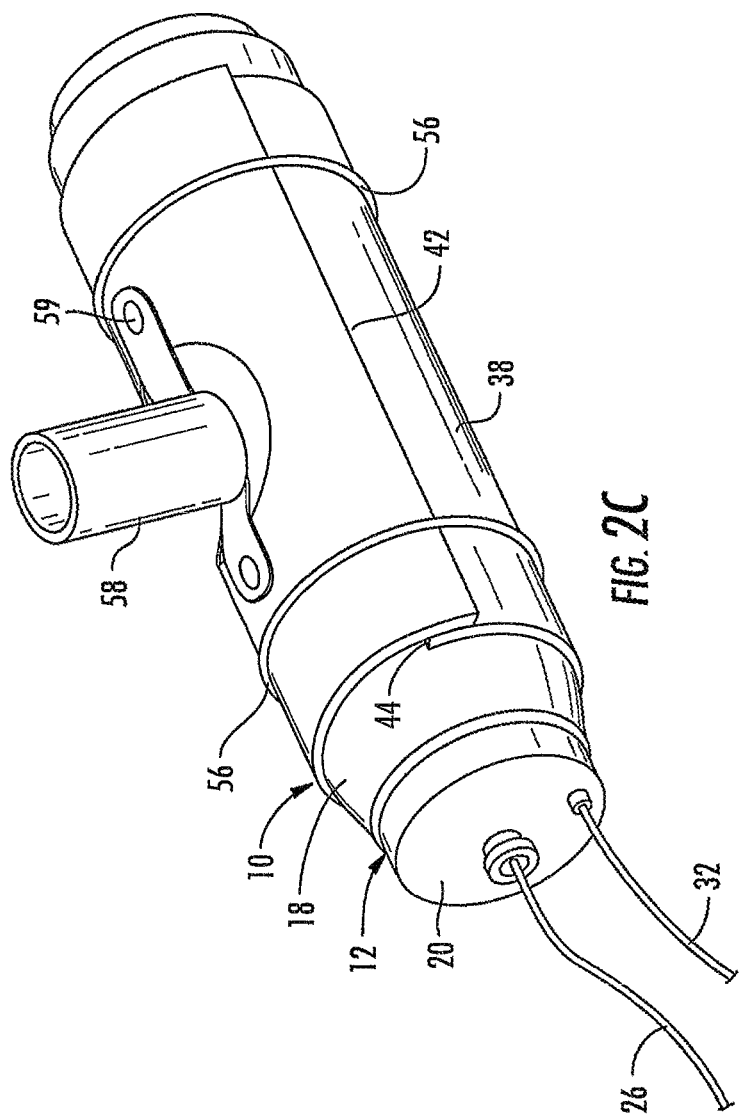
FIG. 2C is a perspective view similar to FIG. 2A showing the transition tube inverted without the liner or bladder.

As shown in FIGS. 2A, 2B and 2C, some embodiments include elastic bands 56 to help secure the liner assembly 14, bladder assembly 16, and transition tube assembly 58 to the launcher device 12. The elastic bands 56 help hold the assemblies in place as the launcher device 12 is moved along the main pipe line 50.

Figure 5:
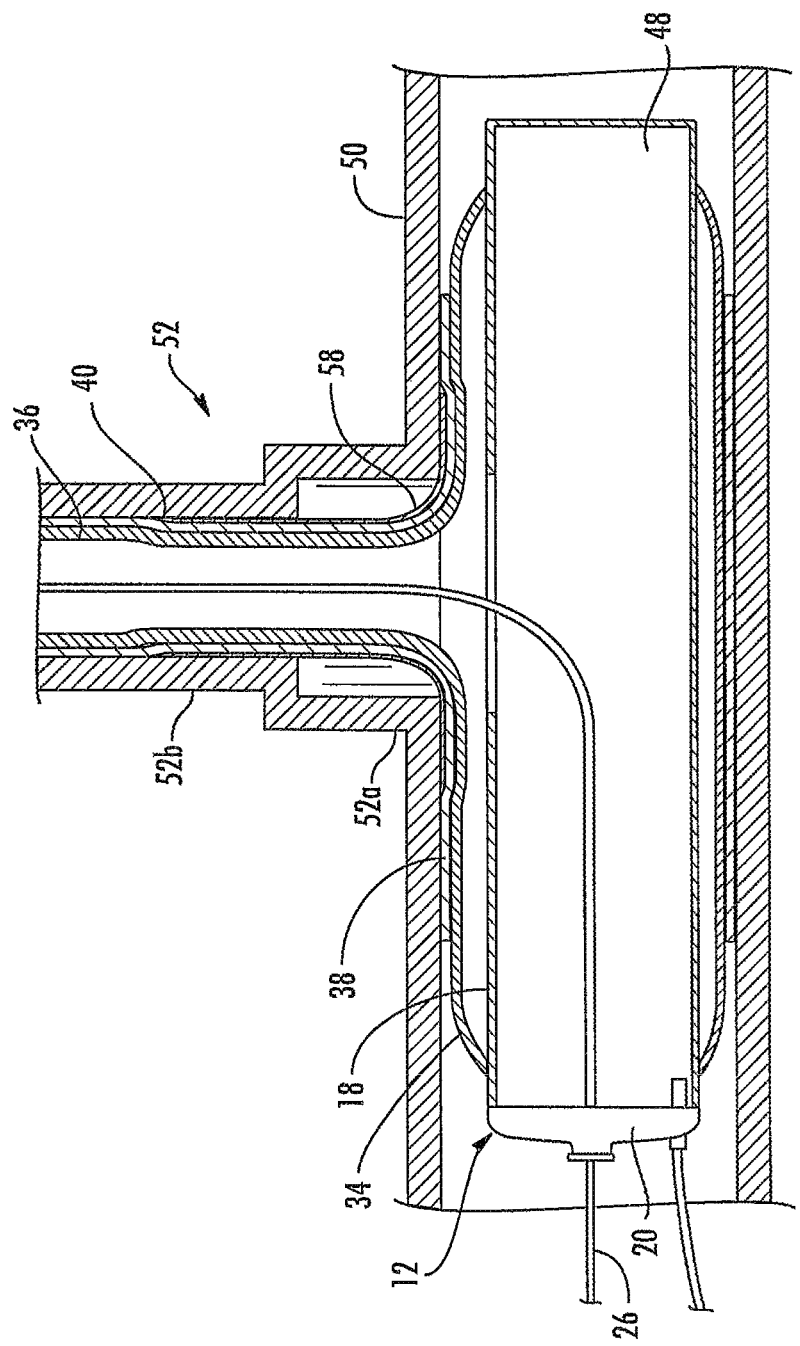
FIG. 5 is a sectional view of a launcher device positioned inside a main pipe line with a connecting lateral pipe line showing one embodiment of the present invention after inversion into the lateral pipe line.

The transition tube 58 is secured to the repair assembly 10 and positioned at least partially inside the lateral liner tube 40 proximate the liner juncture as shown in FIG. 4. The transition tube 58 is combined with the repair assembly 10 by any suitable means, which may include mechanical fasteners, rubber bands, buttons, or an adhesive. In the embodiment shown in FIG. 2A the transition tube 58 is combined with the main liner member 38 using snaps 59. FIG. 2B shows an embodiment wherein the transition tube 58 includes a collar portion combined with the main liner member 38 using snaps 59. The collar portion extends outwardly from an end of the transition tube 58 with the collar portion positioned on the outside of the main liner member proximate the liner juncture. FIG. 2C shows a perspective view of the transition tube 58 inverted outside the launcher opening 46. In use, the lateral bladder tube 36 and lateral liner tube 40 would be inverted outward through the opening in the transition tube 58 as shown in FIG. 5. FIG. 2C, however, shows only the transition tube 58 to allow easier viewing of this component.

FIG. 5 shows the repair assembly 10 after inversion into the lateral pipe 52. After inversion, the transition tube 58, the lateral bladder tube 36, and the lateral liner tube 40 extend into the first pipe section 52a. The transition tube 58 is on the outside of the lateral bladder tube 36 and liner tube 40 in the first pipe section 52a. The transition tube 58 may extend partially into the second pipe section 52b as shown in FIG. 5. The lateral bladder tube 36 and lateral liner tube 40 continue into the second pipe section 52b (beyond the point where the transition tube 58 terminates) to complete the repair. The transition tube 58 effectively takes a lateral pipe 52 having two different diameters and creates a lateral pipe having a uniform diameter so that the liner assembly 14 and bladder assembly 16 only need to be a single diameter. The transition tube 58 creates a surface against which the lateral liner tube 40 can be compressed by the lateral bladder tube 36 to help contain the lateral liner tube 40 in the wider first pipe section 52a.

The transition tube 58 is comprised of any suitable material. In some embodiments, the transition tube 58 is comprised of a material that is impermeable and of sufficient strength to contain the lateral liner tube 40 when force is applied against it (e.g., by the lateral bladder tube 40 in some embodiments). In some embodiments the transition tube 58 is made of a non-stretching material so that its diameter does not change (or only changes minimally) when force is applied against its internal surface by pressure and/or the expansion of the lateral bladder tube 40. In some embodiments the transition tube 58 is made from the same material as the lateral bladder tube 36.

FIG. 3 shows an embodiment wherein a brim-style junction compression gasket 61 is combined with the repair assembly 10. The brim-style junction gasket 61 may be a hydrophilic gasket. The brim-style junction gasket 61 is positioned over the opening 46 in the launcher device 12 and is secured to the repair assembly 10 over the transition tube 58, liner assembly 14, and bladder assembly 16. The brim-style junction gasket is combined with the repair assembly 10 by any suitable means, which may include mechanical fasteners, buttons, or an adhesive. In the embodiment shown in FIG. 3 the brim-style junction gasket 61 is combined with the main liner member 38 using snaps 59. These types of junction gaskets are known in the art. One example of a brim-style junction gasket 61 is disclosed in U.S. Pat. No.

8,667,992 issued on Mar. 11, 2014 titled "Device and Method for Repairing Pipe", the disclosure of which is incorporated by reference. Generally, the brim-style junction gasket 61 includes a brim portion which is attached to the repair assembly 10 and a cylindrical or cone portion extending upward from the brim portion. The cylindrical portion of the brim-style junction gasket 61 may be fitted over the transition tube 58 and remain outside the liner assembly 14 during transport through the main pipe 50. The transition tube 58 may have openings adapted to receive a portion of the fasteners (e.g., the male end of snaps 59) so that the fasteners (which attach the brim-style junction gasket 61 to the main liner member 38) also attach the transition tube 58 between the gasket 61 and the main liner member 38. After inversion, the brim-style junction gasket 61, the transition tube 58, the lateral bladder tube 36, and the lateral liner tube 40 extend into the first pipe section 52*a*. The brim-style junction gasket 61 is on the outside of the transition tube 58, followed by the lateral liner tube 40 and finally the lateral bladder tube 36 is the inside layer.

As can be seen in FIGS. 2-3, the main liner member 38 is comprised of what is initially a flat sheet of material which is wrapped around the outside of the main bladder tube 34 and the launcher device 12. The main liner member 38 includes overlapping edges 42, 44. The launcher device 12 includes a launcher device opening 46, and the lateral liner tube 40 is contained within the launcher device cavity 48. Similarly, the lateral bladder tube 36 is contained within the cavity 14 and surrounds the lateral liner tube 40. Both the main liner member 38 and the lateral liner tube 40 are comprised of a felt layer, which is the lining surface that contacts the interior surface of the transition tube 58 and the host pipe, and a polymer coating is on the opposite surface.

In some embodiments, the liner assembly 14 is attached to the bladder assembly 16 by a frangible attachment. The frangible attachment may be a solvent that chemically bonds the coating of the liner to the bladder. The bonding is intended to be such that it attaches the liner assembly 14 to the bladder assembly 16. However, it is possible by pulling on pull line 26 to break the frangible attachment and remove the bladder from the pipe system leaving behind the cured and hardened liner assembly 14.

In use, air pressure is introduced in the cavity 48 through air hose 32, inverting the transition tube 58 into the first portion of the lateral pipe line 52*a* (and optionally a short distance into the second portion of the lateral pipe line 52*b* as shown in FIG. 5). The air pressure urges liner tube assembly 14 into contact with the interior walls of the main pipe line 50, the interior portion of the transition tube 58, and the walls of the second portion of the lateral pipe line 52*b*. The continued air pressure causes the lateral bladder tube 36 and the lateral liner tube 40 to invert outwardly through the launcher device opening into the lateral pipe line 52 from the position shown in FIG. 4 to the position shown in FIG. 5. While air is the preferred pressurized material, other gasses or fluids may be used. It should be noted that this inversion process causes the transition tube 58 to move from a position inside of the lateral liner tube 40 and lateral bladder tube 36 to a position outside of the lateral liner tube 40 and lateral bladder tube 36 as shown in FIG. 5. Beyond the distal end of the transition tube 58 the lateral liner tube 40 is the outermost layer with the bladder tube 36 inside the lateral liner tube 40 exerting pressure against the lateral liner tube 40. Pressure within cavity 48 is maintained until the liquid hardenable material, preferably a resin activated with a catalyst, cures and hardens. This results in the liner assembly 14 assuming a rigid configuration, forming a lining to the lateral pipe line 52 and the main pipe line 50.

Figure 6:
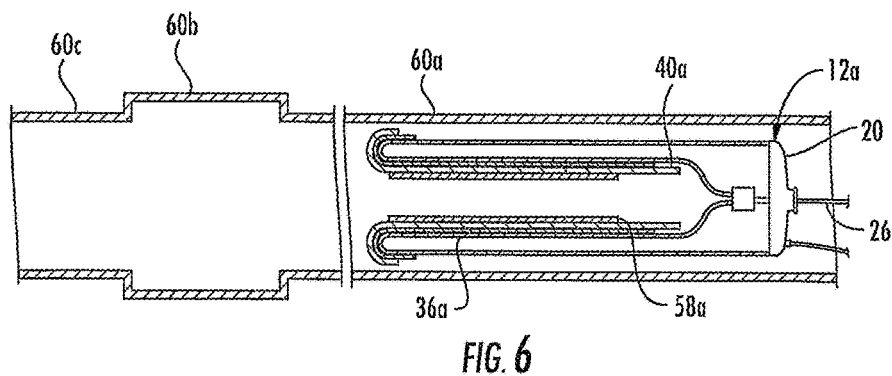
FIG. 6 is a section view of a launcher device positioned within a pipe line showing one embodiment of the present invention.
Figure 7:
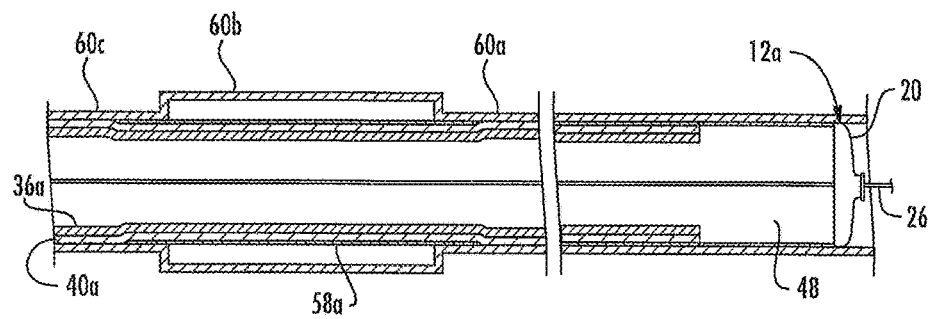
FIG. 7 is a sectional view of a launcher device positioned with a pipe line showing one embodiment of the present invention after inversion.
Figure 8:
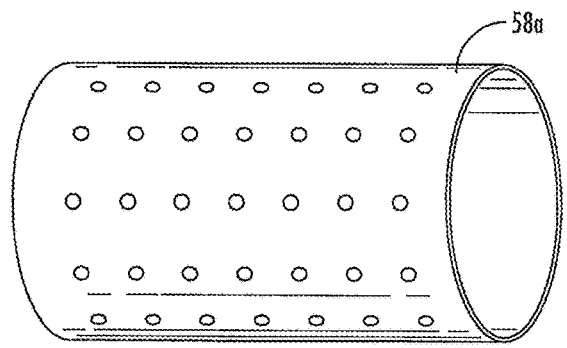
FIG. 8 is a perspective view of one embodiment of a transition tube.

FIGS. 6, 7 and 8 illustrate an embodiment wherein the liner tube 40*a* and transition tube 58*a* are adapted for inversion into a single linear pipe having first pipe section 60*a*, a second pipe section 60*b*, and a third pipe section 60*c*. The second pipe section 60*b* has a diameter greater than an inside diameter of the first pipe section 60*a* and the third pipe section 60*c*. In some embodiments a bladder tube 36*a* is also used as shown and described herein. A launcher device 12*a* (similar to the launcher device 12 disclosed above) includes a liner tube 40 frangibly combined with a bladder tube 36*a*. FIG. 6 shows the components combined with the launcher device 12*a* before inversion. FIG. 7 shows the components after inversion into the pipe 60*a*, 60*b*, 60*c*. After inversion, the bladder tube 36*a* and the liner tube 40*a* extend through all three pipe sections 60*a*, 60*b*, and 60*c*. The transition tube 58*a* spans the second pipe section 60*b* and may extend a short distance into the first pipe section 60*a* and the third pipe section 60*c* as shown in FIG. 7. The transition tube 58*a* effectively takes a pipe 60*a*, 60*b*, 60*c* having two different diameters and creates a pipe having a uniform diameter so that the liner tube 40*a* and bladder tube 36*a* only need to be a single diameter. The transition tube 58*a* creates a surface against which the liner tube 40*a* can be compressed by the bladder tube 36*a* to help prevent the liner tube 40*a* from being overstretched in the wider second pipe section 60*b*.

The second pipe section 60*b* may be any distance away from the launcher device 12*a*. Some embodiments of the invention include methods for determining the proper length and placement of the transition tube 58*a* within the liner tube 40*a* to ensure the liner tube 40*a* spans over the second pipe section 60*b* without unnecessarily extending too far into the first pipe section 60*a* or the third pipe section 60*c*. One method for doing this includes measuring the distance between the proximal end of the liner tube 40*a* (the end nearest to the launcher device 12*a*) and the beginning and end of the second pipe section 60*b*. A camera combined with a cable or rope can be extended into the sewer pipe to locate the second pipe section 60*b*. Once located, the cable or rope can be marked and the marked length of the cable or rope can be used to determine the proper position of the transition tube 58*a* relative to the length of the liner tube 40*a*. Other methods for determining the distance between the proximal end of the liner tube 40*a* and the beginning and end of the second pipe section 60*b* may also be used. The transition tube 58*a* is then secured to the liner tube 40*a* at the proper position as explained below.

In the embodiment shown in FIGS. 6-8 the transition tube 58*a* is secured to the liner tube 40*a* before the liner tube 40*a* is impregnated with resin since it is difficult to secure the transition tube 58*a* to the liner tube 40*a* after the liner is impregnated. The attachment between the transition tube 58*a* and the liner tube 40*a* may be a solvent that chemically bonds the coating of the transition tube 58*a* to the liner tube 40*a*. The bonding is intended to be such that it secures the transition tube 58*a* to the liner tube 40*a*. There may be other means of securing the transition tube 58*a* to the liner tube 40*a*, including stitches, buttons, snaps, hook and loop fasteners (Velcro®), two-sided tape, glue, welding techniques and such including but not limited to the use of hot air, sonic waves, RF waves, microwaves, and impulses of other types.

FIG. 8 shows an embodiment of a transition tube 58*a* which may be used with the embodiment shown in FIGS. 6 and 7. As explained above, the transition tube 58*a* is secured to the liner tube 40*a* prior to impregnating the liner tube 40*a* with resin. The transition tube 58a shown in FIG. 8 has a plurality of openings or perforations adapted to allow resin to pass through and contact the liner tube 40a during the wet out process so that the transition tube 58a does not prevent resin impregnation.

In the embodiments shown and described above, the repair assembly 10 includes a launcher device 12 or 12a having mounted thereto a liner assembly 14 or 40a, a bladder assembly 16 or 36a, and a transition tube 58 or 58a. In some embodiments, however, the bladder assembly 16 or 36a is not part of the repair assembly 10. Instead, in some embodiments air pressure is used to invert the liner assembly 14 or 40a and transition tube 58 or 58a into and against the internal wall of the pipe as the liner assembly cures and hardens without using a bladder assembly 16 or 36a without using a bladder assembly 16 or 36a.

Figure 9:
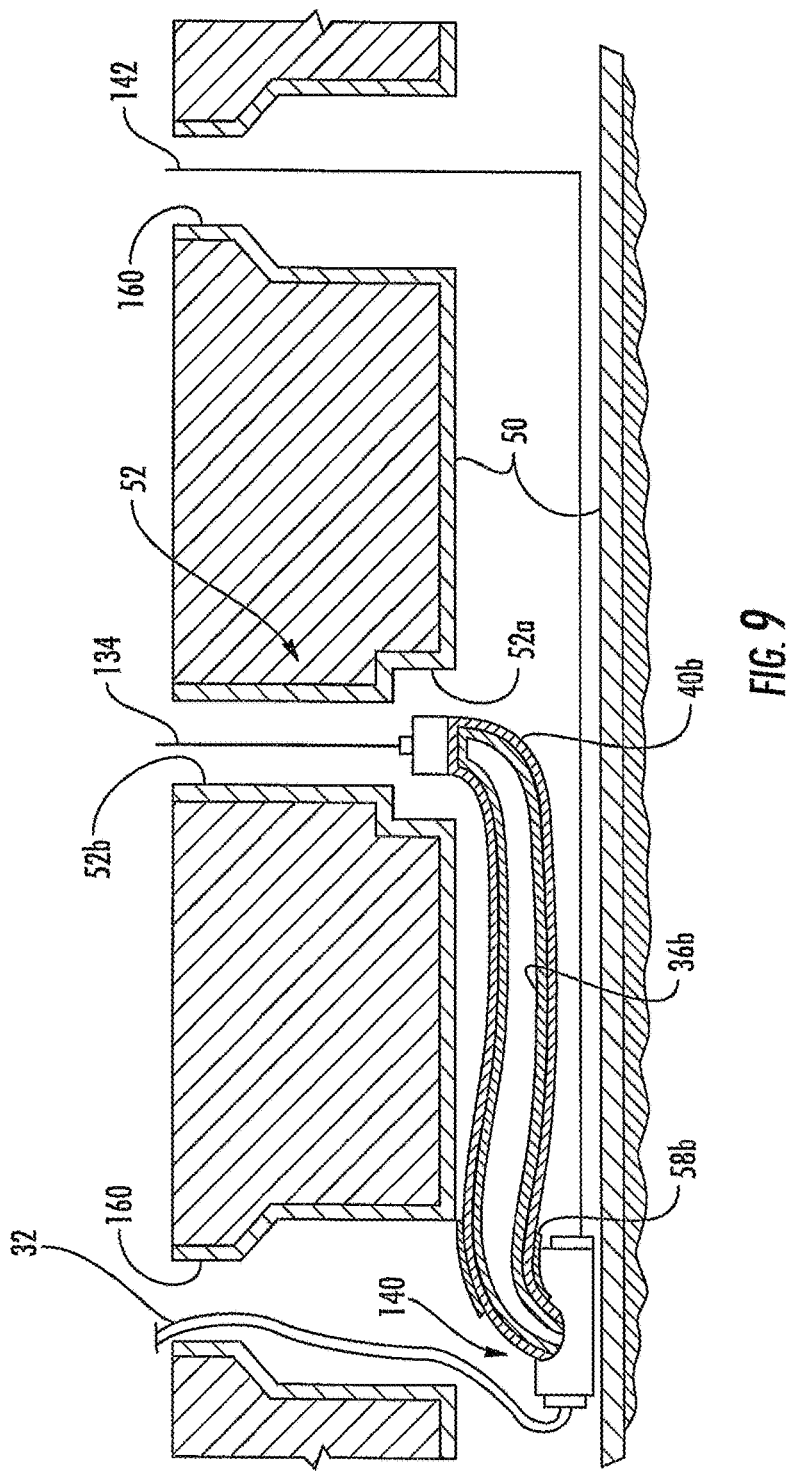
FIG. 9 is a sectional view of a pull-in-place embodiment inside a main pipe line with a connecting lateral pipe line.
Figure 10:
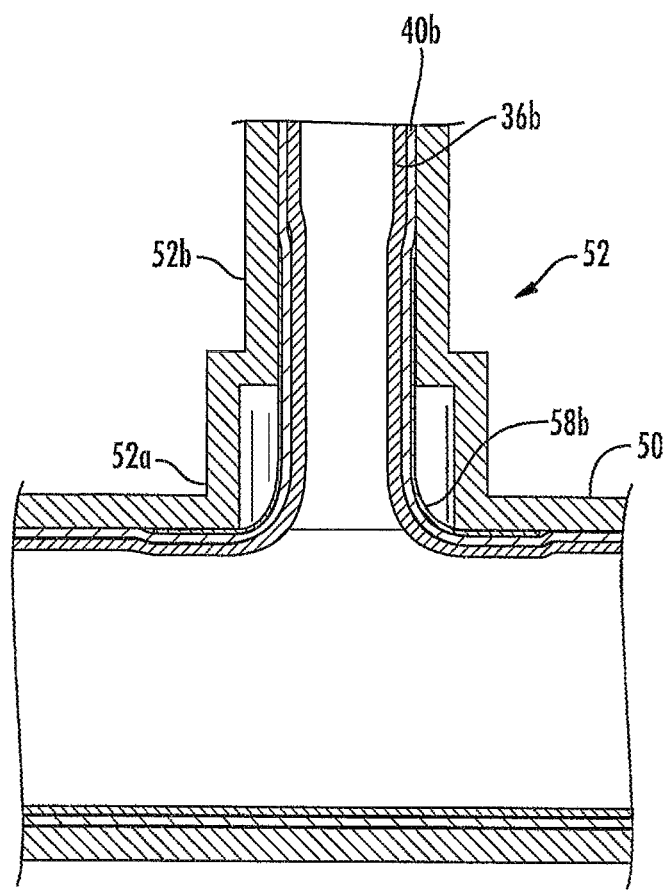
FIG. 10 is a sectional view showing one embodiment of the present invention after the assembly has been pulled into place.

While the embodiment of the invention described above is intended for use with an inversion-type application wherein the transition tube 58, lateral bladder tube 36, and the lateral liner tube 40 invert outwardly into the lateral pipe line 52, those skilled in the art will appreciate that the invention can also be used in pull-in-place applications as shown in FIGS. 9 and 10. As is known in the art, in pull-in-place applications the liner 40b is prepared for installation by inserting the bladder 36b into the liner 40b and wetting the liner 40b. The transition tube 58b is secured to the outside of the liner 40b as shown in FIG. 9. The position of the transition tube 58b along the length of the liner 40b must correspond to the wider lateral pipe section 52a as in the previous embodiments. The proper position of the transition tube 58b relative to the liner 40b is determined by any suitable method, including the methods described above in the previous embodiment.

The bladder/liner/transition tube assembly is launched through a manhole 160 and into a main pipe 50. The installation cable 134, which is combined with the leading end of the assembly has been previously fed through a lateral pipe 52 that is connected to the main pipe 50. The cable 134 is used to pull the assembly into the main pipe 50 and lateral pipe 52. Once the full length of the lateral portion of the assembly is in the main pipe 50, the installation cables 142 and 134 are pulled simultaneously. Pulling of the installation cable 142 advances the carrier 140 and hence assembly towards the junction defined by the main and lateral pipes 50 and 52 respectively. Pulling of the installation cable 134 advances the lateral portion of the bladder assembly up into the lateral pipe 52. As described above with respect to other embodiments, pressure is introduced into the assembly through hose 32 and into carrier 140 to press the liner tube 40b against the lateral pipe 52b. Pressure is maintained until the liquid hardenable material used to wet the liner 40b, preferably a resin activated with a catalyst, cures and hardens. This results in the liner assembly assuming a rigid configuration, forming a lining to the lateral pipe line 52 as shown in FIG. 10. The transition tube 58 effectively takes a lateral pipe 52 having two different diameters 52a, 52b and creates a lateral pipe having a uniform diameter so that the liner assembly and bladder assembly only need to be a single diameter. The transition tube 58b creates a surface against which the lateral liner tube 40b can be compressed by the lateral bladder tube 36b to help contain the lateral liner tube 40b in the wider first pipe section 52a.

As mentioned above, the invention may also be used along the length of a single pipe having two different diameters instead of at the junction of two pipes.

The invention has been shown and described above with reference to the preferred embodiments, and it is understood that many modifications, substitutions, and additions may be made which are within the intended spirit and scope of the invention. The invention may be used with any suitable pipe system, including above ground pipe systems and below ground pipe systems. The invention is only to be limited by the claims appended hereto.

What is claimed is:

1. A method of repairing a pipe having a first pipe section in communication with a second pipe section, the first pipe section having an inside diameter greater than an inside diameter of the second pipe section, the method comprising:
    taking a liner tube;
    taking a transition tube having an inside surface and an outside diameter smaller than the inside diameter of the first pipe section;
    positioning the transition tube and the liner tube;
    moving the transition tube and the liner tube into the first pipe section so that the transition tube is on the outside of the liner tube in the first pipe section, the liner tube positioned against the inside surface of the transition tube to help prevent the liner from being overstretched in the first pipe section, and the liner tube extends beyond the transition tube and within the second pipe section.

2. The method of claim 1 further comprising the step of applying a resinous material capable of curing and hardening to the liner tube before the liner tube is moved into the first and second pipe sections.

3. The method of claim 2 further comprising the step of allowing the resinous material to cure and harden after the liner tube has been moved into the first and second pipe sections.

4. The method of claim 1 wherein the transition tube is positioned inside the liner tube then the transition tube and the liner tube are moved into the first and second pipe sections by inversion.

5. The method of claim 1 wherein the transition tube is positioned outside the liner tube then the transition tube and the liner tube are pulled into the first and second pipe sections.

6. The method of claim 1 wherein the transition tube extends substantially along a length of the first pipe section.

7. The method of claim 1 wherein the transition tube extends into a portion of the second pipe section on the outside of the liner tube.

8. The method of claim 7 wherein the transition tube is comprised of an impermeable material.

9. The method of claim 1 wherein the pipe further comprises a third pipe section having an inside diameter smaller than the inside diameter of the first pipe section and the first pipe section is between the second pipe section and the third pipe section; and
    wherein the transition tube extends into a portion of the third pipe section on the outside of the liner tube.

10. A method of repairing a pipe having a first pipe section, a second pipe section, and a third pipe section, wherein the second pipe section has an inside diameter greater than an inside diameter of the first pipe section and greater than an inside diameter of the third pipe section, the method comprising:
    taking a liner tube;
    taking a transition tube having an inside surface and an outside diameter smaller than the inside diameter of the second pipe section;
    positioning the transition tube and the liner tube;
    moving the transition tube and the liner tube into the second pipe section so that the transition tube is on the outside of the liner tube in the second pipe section, the liner tube positioned against the inside surface of the transition tube to help prevent the liner from being overstretched in the second pipe section, and the liner tube extends beyond the transition tube and within the third pipe section.

11. The method of claim 10 wherein the transition tube spans the second pipe section.

12. The method of claim 10 wherein the transition tube extends into a portion of the third pipe section on the outside of the lateral liner tube.

13. The method of claim 10 wherein the transition tube is comprised of an impermeable material.

14. The method of claim 10 further comprising the steps of taking a bladder tube, positioning the bladder tube with the transition tube and the liner tube, and moving the bladder tube, transition tube, and liner tube into the second pipe section so that the transition tube is on the outside of the liner tube and the bladder tube is on the inside of the liner tube.

15. The method of claim 14 wherein the liner tube is positioned inside the bladder tube then the bladder tube, transition tube and the liner tube are moved into the second and third pipe sections by inversion.

16. The method of claim 14 wherein the liner tube is positioned outside the bladder tube then the bladder tube, transition tube and the liner tube are pulled into the second and third pipe sections.

17. The method of claim 10 wherein the liner tube has a first end secured to a launcher device and the transition tube is secured to the liner tube a predetermined distance away from the first end of the liner tube.

18. The method of claim 17 wherein the predetermined distance is about the same as a distance between the first end of the liner tube and the second pipe section.

19. The method of claim 10 wherein the transition tube has a plurality of openings adapted to allow resin to pass through.

20. An apparatus for repairing a portion of a single linear pipe having a first pipe section, a second pipe section, and a third pipe section, wherein the second pipe section has an inside diameter greater than an inside diameter of the first pipe section and greater than an inside diameter of the third pipe section, the apparatus comprising:

a liner assembly comprising a liner tube having a first end;

a transition tube having an inside surface and an outside diameter smaller than the inside diameter of the second pipe section and a length substantially equal to or greater than the length of the second pipe section, the transition tube being secured to the liner assembly a predetermined distance from the liner tube first end;

wherein upon inversion of the transition tube and the liner tube into the second pipe section the transition tube is on the outside of the liner tube in the first pipe section, the liner tube is positioned against the inside surface of the transition tube to help prevent the liner from being overstretched in the second pipe section, and the liner tube extends beyond the transition tube and within the third pipe section.

21. The apparatus of claim 20 wherein the transition tube is comprised of an impermeable material.

22. The apparatus of claim 20 wherein the transition tube has a plurality of openings adapted to allow resin to pass through.

23. The apparatus of claim 20 further comprising a bladder assembly having a bladder tube.

24. The apparatus of claim 23 wherein upon inversion into the second pipe section the bladder tube is inside the lateral liner tube and extends beyond the transition tube and within the third pipe section.

* * * * *